US008952658B2

(12) United States Patent
Clarke

(10) Patent No.: US 8,952,658 B2
(45) Date of Patent: Feb. 10, 2015

(54) SET OF STANDARDIZED BATTERY CARTRIDGES AND RECHARGER

(75) Inventor: Michael Paul Clarke, Ellenbrook (AU)

(73) Assignee: International Business Machines Corporation, Armonk, NY (US)

( * ) Notice: Subject to any disclaimer, the term of this patent is extended or adjusted under 35 U.S.C. 154(b) by 717 days.

(21) Appl. No.: 13/237,925

(22) Filed: Sep. 20, 2011

(65) Prior Publication Data

US 2013/0069593 A1    Mar. 21, 2013

(51) Int. Cl.
 *H02J 7/00*     (2006.01)
 *H01M 10/46*    (2006.01)
 *H01M 2/10*     (2006.01)
 *G06F 1/16*     (2006.01)

(52) U.S. Cl.
 CPC ............ *H02J 7/0045* (2013.01); *H01M 10/46* (2013.01); *H01M 2/1022* (2013.01); *H01M 2/1027* (2013.01); *G06F 1/1635* (2013.01); *H02J 7/0004* (2013.01); *H02J 2007/0001* (2013.01)
 USPC ............ 320/112; 320/107; 320/111; 320/113

(58) Field of Classification Search
 CPC ...................................... Y02E 60/12
 USPC ................................ 320/107, 114
 See application file for complete search history.

(56) References Cited

U.S. PATENT DOCUMENTS

| 6,023,147 A | 2/2000 | Cargin, Jr. et al. ............ 320/114 |
| 6,127,801 A | 10/2000 | Manor ........................ 320/112 |
| 7,855,008 B2 | 12/2010 | Hakunti et al. ............... 429/100 |
| 2003/0095194 A1* | 5/2003 | Suzuki et al. ........... 348/231.99 |
| 2009/0001816 A1 | 1/2009 | Tarter .............................. 307/65 |
| 2009/0014427 A1* | 1/2009 | Miyazaki et al. ............. 219/229 |

* cited by examiner

*Primary Examiner* — Edward Tso
*Assistant Examiner* — Ahmed Omar
(74) *Attorney, Agent, or Firm* — VanLeeuwen & VanLeeuwen; Jeffrey S. LaBaw

(57) ABSTRACT

An approach is provided in which a battery cartridge aperture is included in a device. The edges of the battery cartridge aperture form a shape that match a selected battery cartridge and indicate a power configuration. The selected battery cartridge is selected from a variety of different battery cartridges with each of the battery cartridges having a unique external shape with each unique external shape corresponding to a different power configuration. The various battery cartridges each have a different configuration of battery cells within the battery cartridge that provide power to the device through electrical contacts. The contacts are affixed within the device with each of the contacts positioned to correspond with electrical contacts from the battery cartridge. In one embodiment, protective covers are provided that cover the contacts with the covers automatically retracting to expose the contacts when the battery cartridge is inserted in the device.

17 Claims, 7 Drawing Sheets

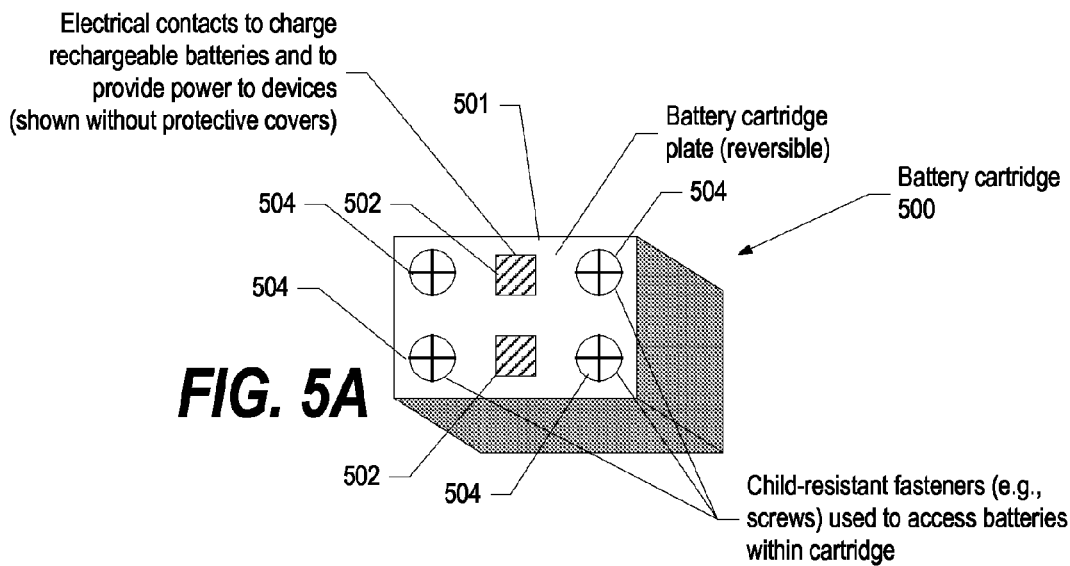
FIG. 5A
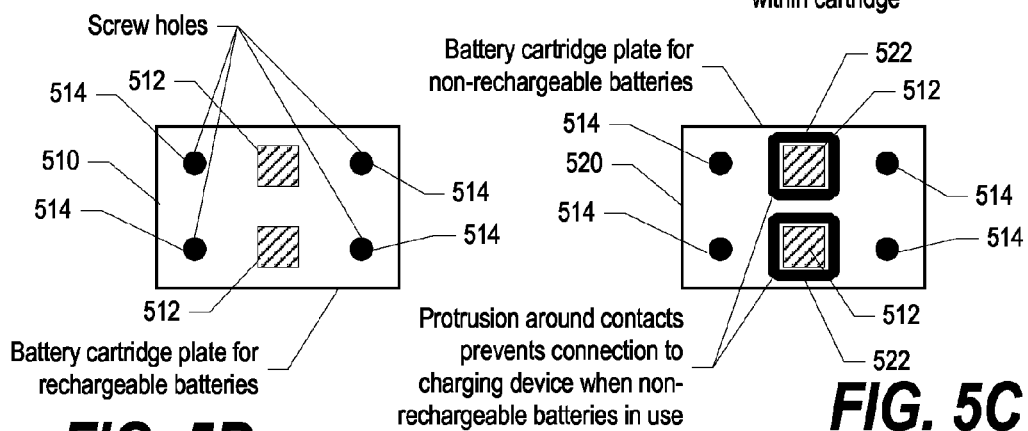
FIG. 5B
FIG. 5C
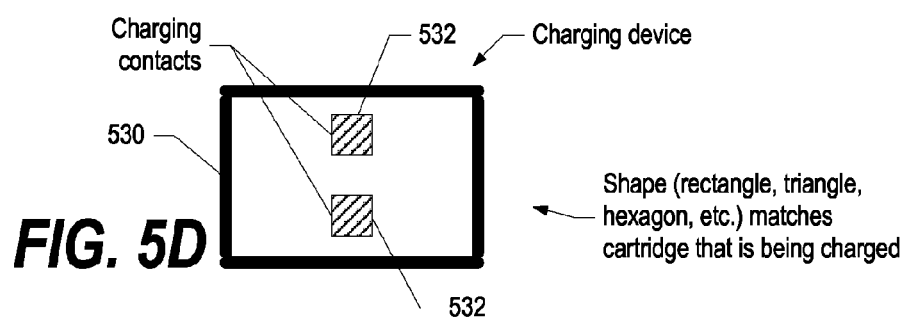
FIG. 5D

_US 8,952,658 B2_

SET OF STANDARDIZED BATTERY CARTRIDGES AND RECHARGER

TECHNICAL FIELD

The present disclosure relates to battery cartridges with exterior shapes adapted for insertion in devices based on the power needs of the device. More particularly, the present disclosure further relates to a charging mechanism that charges battery cells included in the cartridge based on the charge need as indicated by the external shape of the battery cartridge.

BACKGROUND OF THE INVENTION

Many devices, especially children's toys, are battery powered. Many of these devices have battery enclosures making it difficult, especially for children, to replace the batteries. These enclosures often require tools, such as a screwdriver, to access batteries within the enclosure. In addition, many of these devices require a large number of batteries, disposal of which can be problematic depending on the disposal laws and regulations pertaining to the consumer based on the consumer's location. Because batteries have relatively short lives, especially when powering a child's toy that encounters substantial use, battery changes may need to occur frequently. Due to the above issues, the child may need an adult to replace the batteries. In other cases, handling of batteries by a child may be dangerous as the child may experience an electric shock or may insert the batteries into the device incorrectly which may damage the device or cause a potential fire danger.

SUMMARY

An approach is provided in which a battery cartridge aperture is included in a device. The edges of the battery cartridge aperture form a shape that match a selected battery cartridge and indicate a power configuration. The selected battery cartridge is selected from a variety of different battery cartridges with each of the battery cartridges having a unique external shape with each unique external shape corresponding to a different power configuration. The various battery cartridges each have a different configuration of battery cells within the battery cartridge that provide power to the device through electrical contacts. The contacts are affixed within the device with each of the contacts positioned to correspond with electrical contacts from the battery cartridge. In one embodiment, protective covers are provided that cover the contacts with the covers automatically retracting to expose the contacts when the battery cartridge is inserted in the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 5A is a diagram showing a reversible battery cartridge plate;

FIG. 5B is a diagram showing the reversible battery cartridge plate installed for rechargeable batteries;

FIG. 5C is a diagram showing the reversible battery cartridge plate installed for non-rechargeable batteries;

FIG. 5D is a diagram showing a charging pad on a charging device that accommodates the battery cartridge when installed for rechargeable batteries;

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
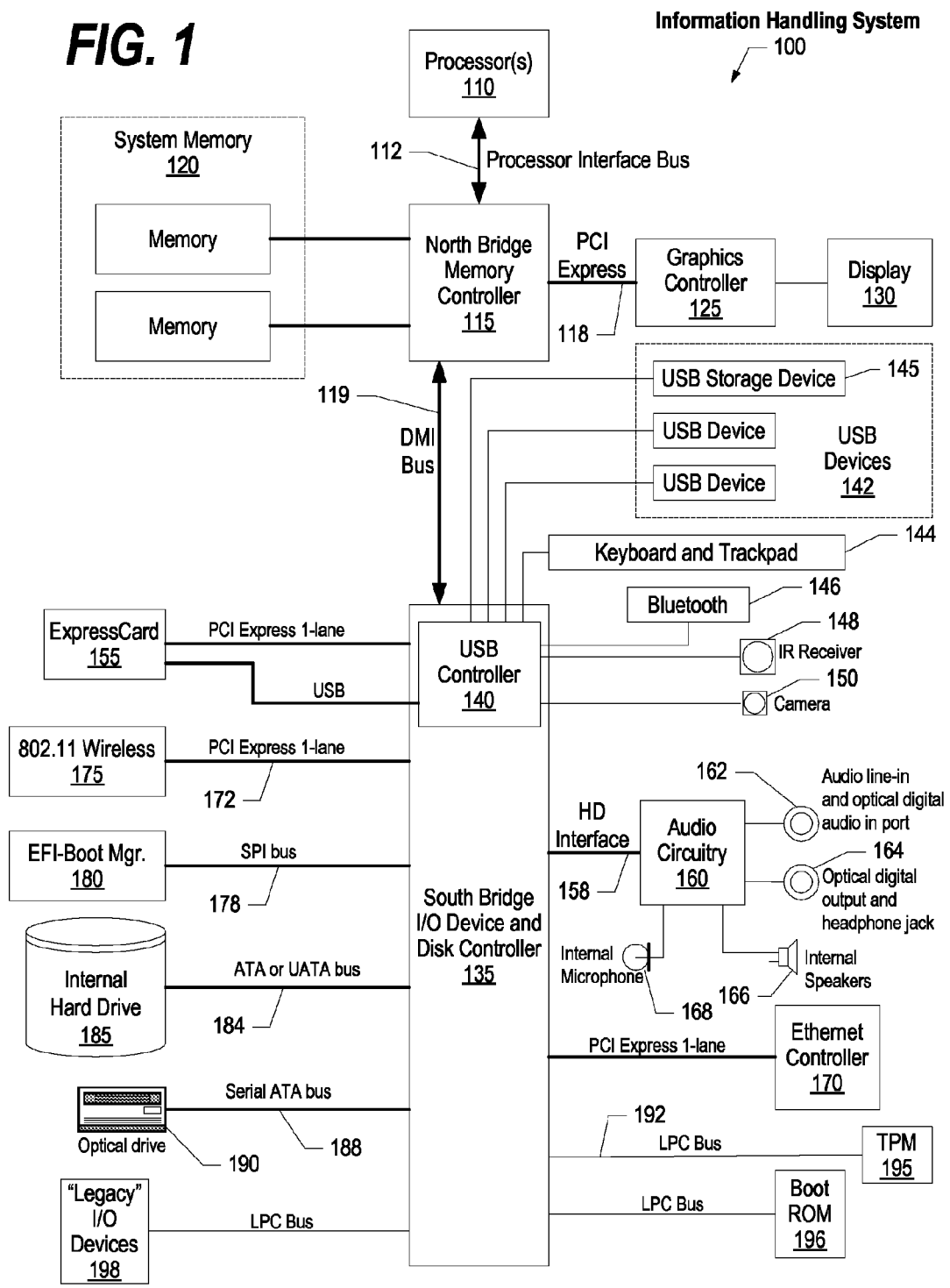
FIG. 1 is a block diagram of a data processing system in which the methods described herein can be implemented.
Figure 2:
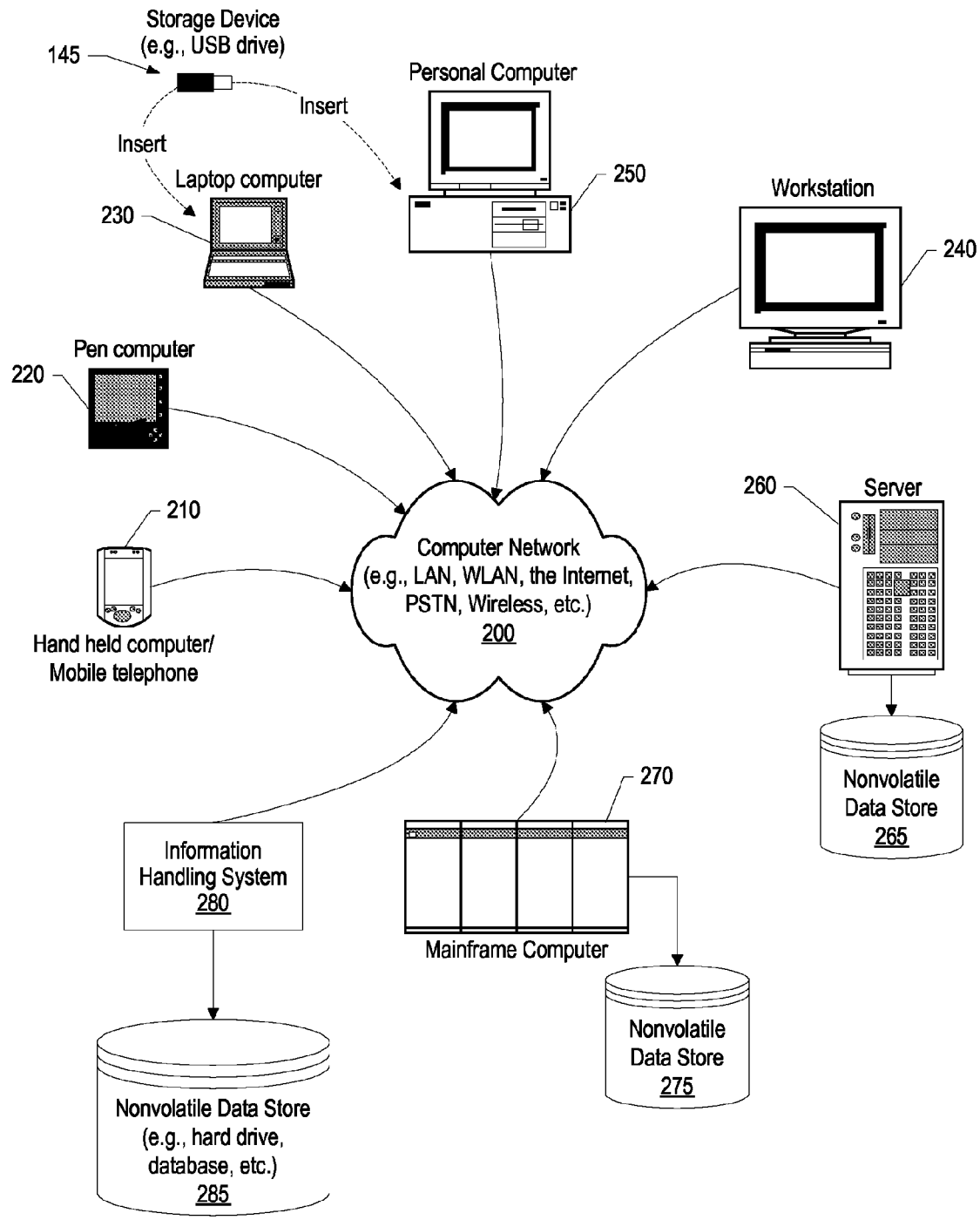
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH).

Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
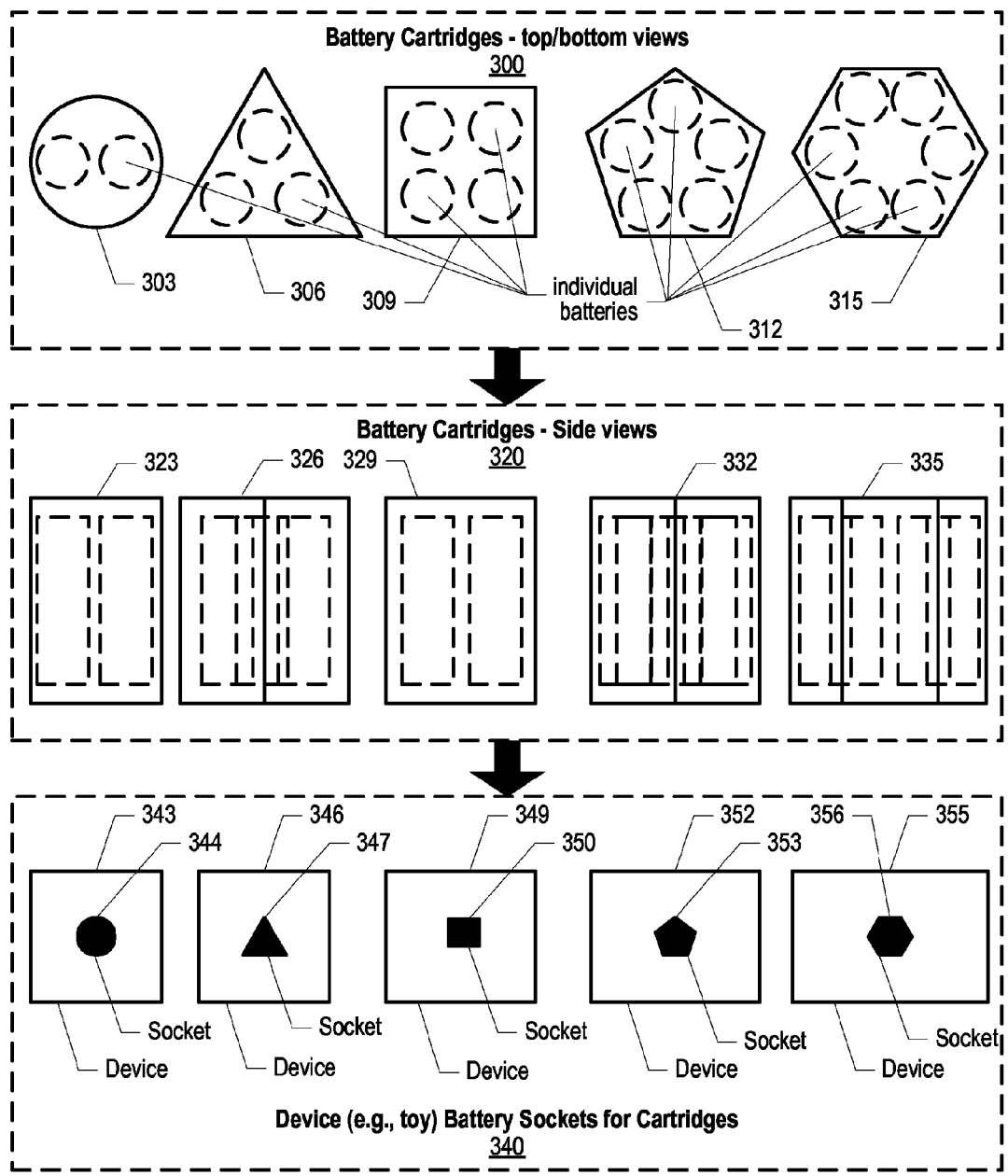
FIG. 3 is a diagram showing various views of various battery cartridges.

FIG. 3 is a diagram showing various views of various battery cartridges. Top/bottom views 300 show examples of five different battery cartridge shapes. Side views 320 show the side views of each of the five battery cartridge examples.

Finally, device view 340 show example devices with apertures that correspond to the various battery cartridges.

In the examples shown, the leftmost cartridge (top/bottom view 303) has a circular base shape and a rectangular side shape 323 forming a cylindrical shaped cartridge that can be inserted into device 343. This cartridge is shown as accommodating two battery cells (e.g., "AA" size batteries, etc.). As shown, device 343 includes circular aperture 344 into which the cylindrical cartridge can be inserted to power device 343. The other shaped cartridges would not fit in device 343 preventing an incorrect cartridge from being inserted.

The next cartridge (top/bottom view 306) has a triangular base shape and side shape 323 forming a triangular shaped cartridge that can be inserted into device 346. This cartridge is shown as accommodating three battery cells (e.g., "AA" size batteries, etc.). As shown, device 346 includes triangular aperture 347 into which the triangular cartridge can be inserted to power device 346. The other shaped cartridges would not fit in device 346 preventing an incorrect cartridge from being inserted.

The next cartridge (top/bottom view 309) has a square base shape and rectangular side shape 329 forming a box shaped cartridge that can be inserted into device 349. This cartridge is shown as accommodating four battery cells (e.g., "AA" size batteries, etc.). As shown, device 349 includes square aperture 348 into which the square, box shaped cartridge can be inserted to power device 349. The other shaped cartridges would not fit in device 349 preventing an incorrect cartridge from being inserted.

The next cartridge (top/bottom view 312) has a pentagon base shape and side shape 332 forming a cartridge that can be inserted into device 352. This cartridge is shown as accommodating five battery cells (e.g., "AA" size batteries, etc.). As shown, device 352 includes pentagon shaped aperture 353 into which the pentagon shaped cartridge can be inserted to power device 352. The other shaped cartridges would not fit in device 352 preventing an incorrect cartridge from being inserted.

The rightmost cartridge (top/bottom view 315) has a hexagon base shape and side shape 335 forming a cartridge that can be inserted into device 355. This cartridge is shown as accommodating six battery cells (e.g., "AA" size batteries, etc.). As shown, device 355 includes hexagon shaped aperture 356 into which the hexagon shaped cartridge can be inserted to power device 355. The other shaped cartridges would not fit in device 355 preventing an incorrect cartridge from being inserted.

As will be appreciated by those skilled in the art, an almost limitless array of cartridge shapes sizes can be utilized based on the power requirements and form factor of the devices. Alternative battery cell configurations can also be provided so that the battery cells inserted in the cartridge are arranged differently, such as shown in FIGS. 4A and 4B.

Figure 4A:
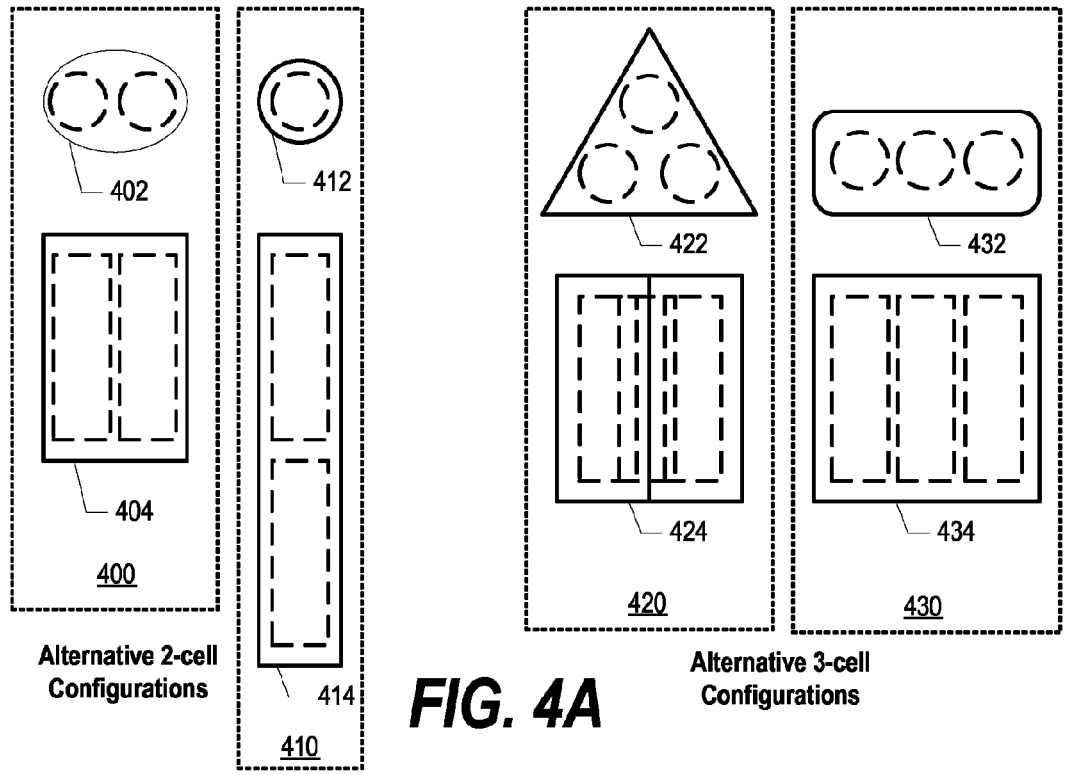
FIG. 4A is a diagram showing alternative battery cell configurations.

FIG. 4A is a diagram showing alternative battery cell configurations. In configuration 400, a two-cell wide configuration is shown with top view 402 and side view 404. In configuration 400, the batteries are arranged beside each other. Alternatively, the same two-cell power supply can be provided by two-cell narrow configuration 410 with top view 412 and side view 414. In configuration 410, the batteries are arranged on top of each other. Alternative three-cell configurations are shown in 420 and 430. In 420, top view 422 shows a triangular arrangement with a side view as shown in 424. In contrast, alternative three-cell configuration 430 shows top view 432 which is largely rectangular in shape with corresponding side view 434.

Figure 4B:
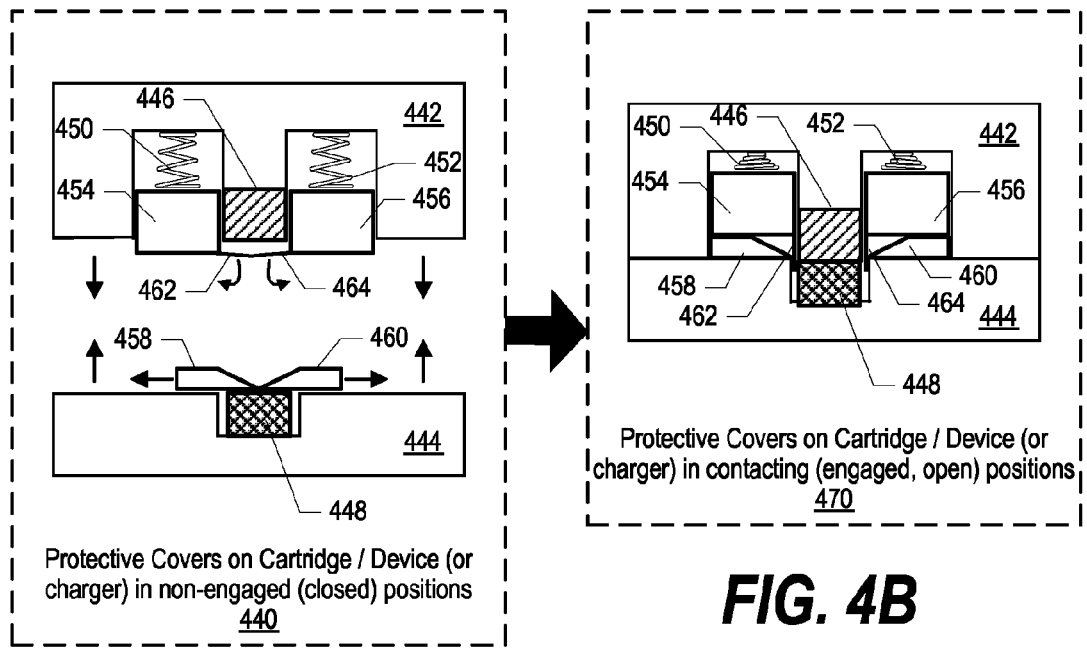
FIG. 4B is a diagram showing protective covers positioned over electrical contacts.

FIG. 4B is a diagram showing protective covers positioned over electrical contacts. Non-engaged view 440 shows device 442 disengaged from battery cartridge 444. Device 442 includes electrical contact 446 which is protected by flaps 462 and 464. The flaps move out of the way when the battery is engaged. Left and right stopper components 454 and 456 are spring-loaded by corresponding springs 450 and 452. When the device is disengaged, the springs operate to move the stopper components past the contact which allows the flaps to cover the contact. In engaged view 470, battery cartridge 444 is inserted into the device causing springs 450 and 452 to compress and stoppers 454 and 456 to be inserted into the device. Flaps 462 and 464 are attached to stoppers 454 and 456 respectively so, insertion of the stoppers into the device cause the flaps to pull apart from each other exposing contact 446 which makes contact with battery cartridge contact 448.

Battery cartridge 444 is also shown with contact 448 and protective covers 458 and 460 which, when inserted into device 442, causes the covers to slide horizontally out of the way, thus exposing battery cartridge contact 448. In engaged view 470, protective covers 458 and 460 are shown pushed out of the way by device contact 446 which allows battery cartridge contact 448 to make electrical contact with device contact 446.

FIG. 5A is a diagram showing a reversible battery cartridge plate. Battery cartridge 500 includes reversible battery cartridge plate 501 with contacts 502. Plate 501 is attached to the cartridge with screws 504.

FIG. 5B is a diagram showing the reversible battery cartridge plate installed for rechargeable batteries. When removed from cartridge 500, plate 501 has once side that includes screw holes 514 and contacts 512. When rechargeable batteries are used, the plate view shown in FIG. 5B is attached to cartridge 500 so that no ridges appear surrounding charging contacts 512.

FIG. 5C is a diagram showing the reversible battery cartridge plate installed for non-rechargeable batteries. When non-rechargeable batteries are used, plate 501 (from FIG. 5A) is reversed revealing raised ridges 522 surrounding contacts 512.

FIG. 5D is a diagram showing a charging pad on a charging device that accommodates the battery cartridge when installed for rechargeable batteries. When attached to charging board 530, the plate shown in FIG. 5B (used for rechargeable batteries) is able to contact charging board supply contacts 532. On the other hand, raised ridges 522 in FIG. 5C prevent contacts 512 from making contact with charging board contact 532 when non-rechargeable batteries are being used. In addition, the charging board shown in FIG. 5D has one or more pad shapes 530 (e.g., formed with ridges, etc.) that correspond to the shape of a particular battery cartridge (e.g., battery cartridge 500 being rectangular), with additional pad shapes provided for additional cartridge types (e.g., triangular, pentagon, hexagon, etc. as shown in FIG. 3).

Figure 6:
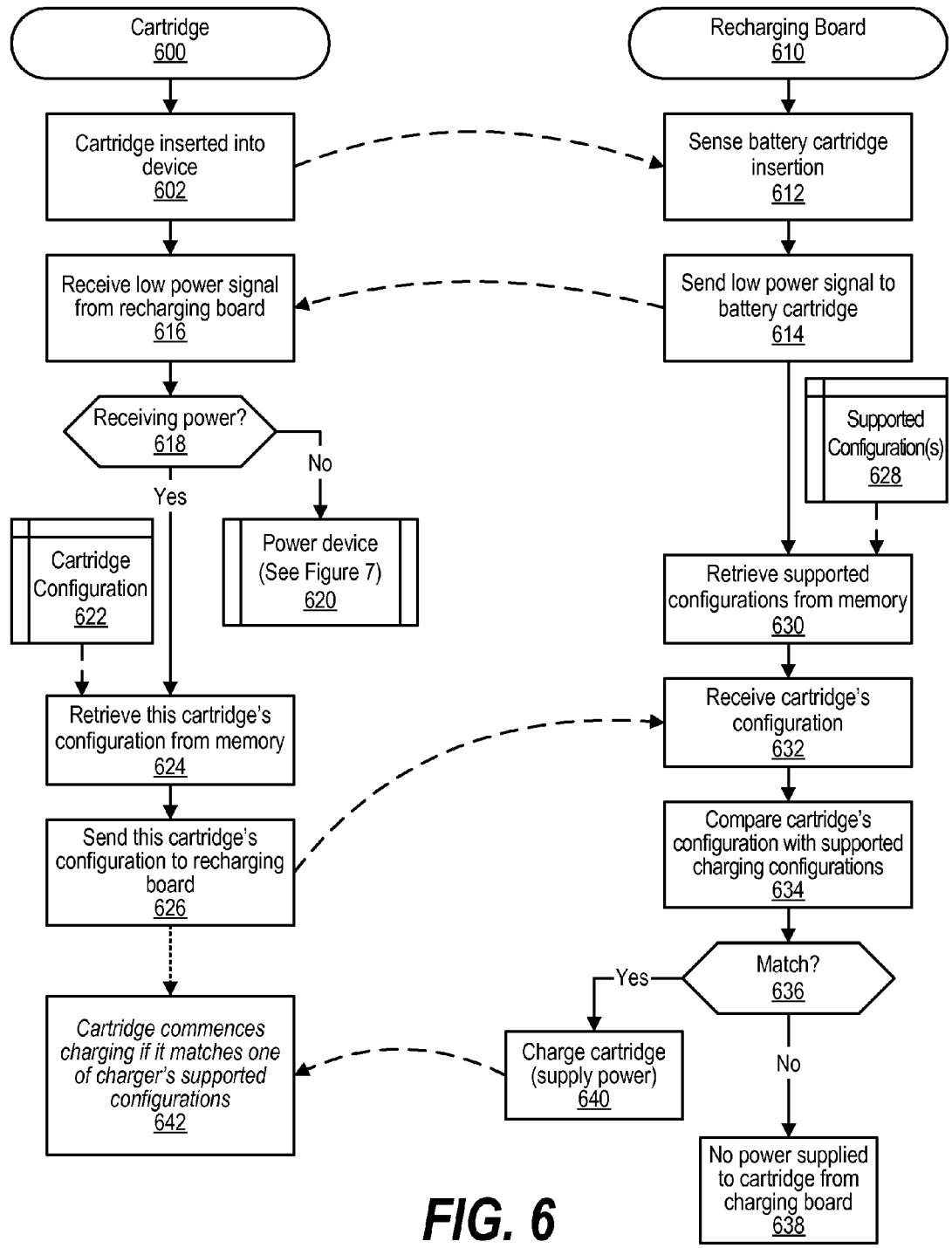
FIG. 6 is a flowchart showing steps taken by the battery cartridge and the recharging board during a recharging operation.

FIG. 6 is a flowchart showing steps taken by the battery cartridge and the recharging board during a recharging operation. Processing commences at 600 whereupon, at step 602, the battery cartridge is inserted into a device (e.g., a charging board, a power-consuming device such as a toy, etc.). In FIG. 6, the device being used is a recharging board. Processing performed by the recharging board commences at 610 whereupon, at step 612 the recharging board senses that a battery cartridge has been inserted in one of the battery charger's recharging pads. At step 614, in response to sensing the insertion of the battery cartridge, a low power signal is sent to the battery cartridge rather than sending a full power stream to the device. The low power signal is designed to accommodate any of the battery cartridges regardless of the robustness or power configuration of the particular cartridge.

Returning to battery cartridge processing, at step 616, the battery senses that it has received a low power signal from the device (indicating that the device is a recharging board rather than a power-consuming device). A decision is made as to whether the battery cartridge is receiving power from the device (decision 618). If the device is not receiving power (the device is a power-consuming device that is drawing power from the cartridge), then decision 618 branches to the "no" branch whereupon, at predefined process 620, the cartridge performs a process to provide power to the device. On the other hand, if the device is receiving power (the low power signal), then decision 618 branches to the "yes" branch whereupon further processing is performed.

At step 624, the battery cartridge retrieves its configuration data from memory 622. At step 626, the retrieved battery cartridge configuration data is transmitted to the recharging board.

Returning to steps performed by the recharging board, at step 630 the recharging board retrieves one or more battery cartridge configurations from memory area 628. The battery cartridge configurations are those configurations that are supported by the recharging board at the pad where the cartridge was inserted. At step 632, the recharging board receives the cartridge's configuration data from the battery cartridge (e.g., transmitted over the contacts). At step 634, the battery cartridge configuration data is compared with the expected (supported) configurations that the charging board retrieved from its memory. A decision is made as to whether the battery cartridges configuration matches one of the supported configurations (decision 636). If the configurations do not match, then decision 636 branches to the "no" branch whereupon, at step 638, the recharging board inhibits the flow of power from the recharging board to the battery cartridge preventing damage to the battery cartridge and minimizing any fire risk. On the other hand, if the configurations match, then decision 636 branches to the "yes" branch whereupon, at step 640, the charging board supplies power to the inserted battery cartridge through the electrical contacts. On the battery cartridge, at step 642, the battery cartridge commences charging only if the battery cartridge's configuration matches one of the configurations supported by the charging board.

Figure 7:
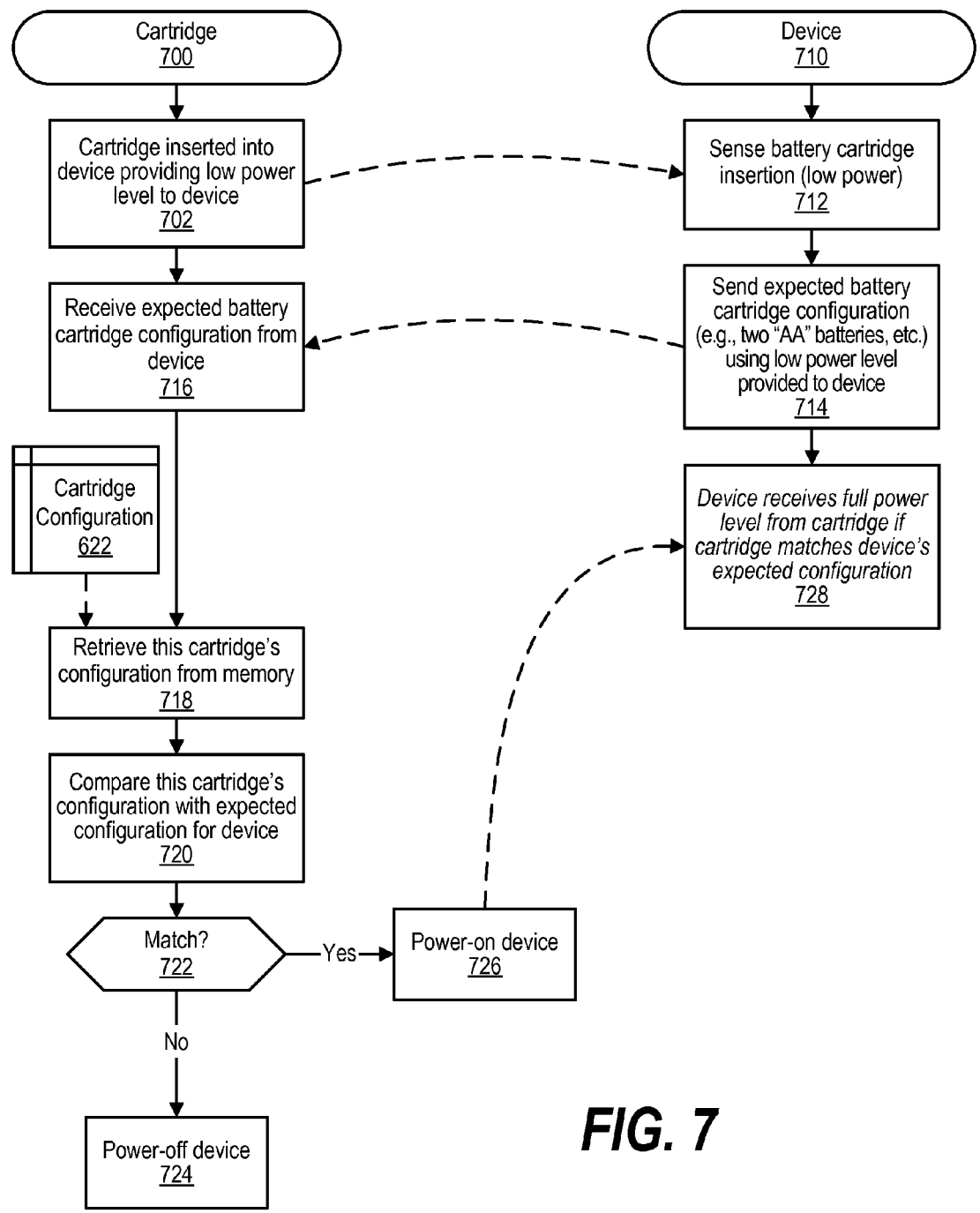
FIG. 7 is a flowchart showing steps taken by the battery cartridge and a device when the cartridge is inserted in the device.

FIG. 7 is a flowchart showing steps taken by the battery cartridge and a device when the cartridge is inserted in the device. The logic shown in FIG. 7 is performed in response to the battery cartridge identifying that the device is not a charging board as shown in FIG. 6 (decision 618 branching to the "no" branch and predefined process 620). Returning to FIG. 7, battery cartridge processing is shown commencing at 700 whereupon, at step 702, the battery cartridge provides a low power signal to the device.

Device processing (a power-consuming device) is shown commencing at 710 whereupon, at step 712, the device senses that a battery cartridge has been inserted into the device and is providing a low power signal rather than a full power signal. Because the low power signal is being received, rather than fully power-on the device, at step 714, the device sends expected battery cartridge configuration data back to the battery cartridge. The device sends the expected battery cartridge configuration data back using the low power signal provided by the battery cartridge and the data is transmitted over the contacts that electrically connect the battery cartridge with the device.

Returning to battery cartridge processing, at step 716, the battery cartridge receives the expected battery cartridge configuration data from the device. At step 718, the cartridge's configuration data is retrieved from memory 622 included in the battery cartridge. At step 720, the battery cartridge configuration data is compared with the expected configurations that the device retrieved from its memory. A decision is made as to whether the battery cartridge's configuration matches the configuration expected by the device (decision 722). If the configurations do not match, then decision 722 branches to the "no" branch whereupon, at step 724, the battery cartridge inhibits the flow of power from the battery cartridge to the device preventing damage to the device and minimizing any fire risk. On the other hand, if the configurations match, then decision 722 branches to the "yes" branch whereupon, at step 726, the battery cartridge supplies a full level of power to the device through the electrical contacts. On the device, at step 728, the device receives full power and commences operation only if the battery cartridge's configuration matches the device's expected power configuration.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A device made by a method comprising:
   forming a battery cartridge aperture in the device, wherein the edges of the battery cartridge aperture form a shape matching a selected battery cartridge, wherein the selected battery cartridge is selected from a plurality of battery cartridges, wherein each of the battery cartridges has a unique external shape in comparison to the other battery cartridges, wherein each of the battery cartridges includes a different configuration of battery cells within the battery cartridge, and wherein each of the battery cartridges includes at least one electrical supply contacts;

including a protective cover over the electrical contacts, wherein the protective cover is physically retracted in response to pressure applied by insertion of the selected battery cartridge; and affixing one or more electrical contacts within the device, wherein each of the electrical contacts are positioned to correspond with one of the electrical supply contacts.

2. The device made by the method of claim 1 wherein the selection of the battery cartridge is based on an electrical supply need of the device.

3. The device made by the method of claim 1 further comprising:
including a battery cartridge insertion sensor in the device that sends an expected cartridge configuration message in response to insertion of one of the plurality of battery cartridges into the aperture, wherein the expected cartridge configuration message is received by the inserted battery cartridge, and wherein the inserted battery cartridge supplies power to the device in response to the expected cartridge configuration message matching a power configuration provided by the inserted battery cartridge.

4. The device made by the method of claim 1, wherein the device is a recharging board and wherein the method further comprises:
including a battery cartridge insertion sensor in the device that receives a cartridge configuration message from the inserted battery cartridge in response to insertion of one of the plurality of battery cartridges into the aperture, and wherein the device supplies power to the inserted battery cartridge device in response to the cartridge configuration message matching a power configuration provided by the recharging board.

5. The device made by the method of claim 4, wherein the device includes a plurality of apertures with each of the apertures having a different external shape to accommodate a different type of battery cartridge, wherein each of the apertures forms a cavity with each cavity having a set of one or more electrical contacts, and wherein a different electrical supply is provided by the device to each of the sets of electrical contacts.

6. An electricity consuming device comprising:
a body with a surface;
a battery cartridge aperture formed in the surface of the device, wherein the battery cartridge aperture forms a shape, and wherein the battery cartridge aperture shape indicates a device power requirement corresponding to the electricity consuming device;
a cavity within the device accessible through the battery cartridge aperture;
a protective cover that covers the plurality of contacts, wherein the protective cover is physically retracted in response to pressure applied by insertion of the battery cartridge; and
a plurality of electrical contacts within the cavity that receive power from a battery cartridge that has an exterior shape corresponding to the battery cartridge aperture shape.

7. The electricity consuming device of claim 6 further comprising:
a physical adapter formed on the protective cover that causes a second protective cover to physically retract in response to the pressure applied by the insertion of the battery cartridge, wherein the second protective cover covers a second plurality of battery contacts included on the battery cartridge.

8. The electricity consuming device of claim 6 further comprising:
a battery cartridge insertion sensor included in the device;
power logic that sends an expected cartridge configuration message in response to insertion of the battery cartridge into the battery cartridge aperture, wherein the expected cartridge configuration message is received by the inserted battery cartridge, and wherein the inserted battery cartridge supplies power to the device in response to the expected cartridge configuration message matching a power configuration provided by the inserted battery cartridge.

9. The electricity consuming device of claim 6, wherein the electricity consuming device is a recharging board and wherein the electricity consuming device further comprises:
a battery cartridge insertion sensor included in the device;
cartridge detection logic in the device that receives a cartridge configuration message from the inserted battery cartridge in response to insertion of the battery cartridge into the aperture; and
power logic in the device that supplies power to the inserted battery cartridge device in response to the cartridge configuration message matching a power configuration provided by the recharging board.

10. The electricity consuming device of claim 9, wherein the device includes a plurality of battery cartridge apertures with each of the apertures having a different external shape to accommodate a different type of battery cartridge, wherein each of the apertures forms a cavity with each cavity having a set of contacts, and wherein a different electrical supply is provided by the device to each of the sets of contacts.

11. An electricity consuming system comprising:
an electric consuming device comprising:
a body with a surface;
a battery cartridge aperture formed in the surface of the device, wherein the battery cartridge aperture forms a shape, and wherein the battery cartridge aperture shape indicates a device power requirement corresponding to the electricity consuming device;
a cavity within the device accessible through the battery cartridge aperture;
a first plurality of electrical contacts within the cavity;
a first protective cover that covers the first plurality of contacts, wherein the first protective cover is physically retracted in response to pressure applied by insertion of the battery cartridge; and
a battery cartridge comprising:
a body with an exterior shape corresponding to the battery cartridge aperture shape; and
a second plurality of electrical contacts that make contact with the first plurality of electrical contacts when the battery cartridge is inserted through the battery cartridge aperture.

12. The electricity consuming system of claim 11 further comprising:
a second protective cover that covers the second plurality of contacts, wherein the protective cover is physically retracted in response to pressure applied by insertion of the battery cartridge.

13. The electricity consuming system of claim 12 further comprising:
a first physical adapter formed on the first protective cover that causes the second protective cover to physically retract in response to the pressure applied by the insertion of the battery cartridge.

14. The electricity consuming system of claim 12 further comprising:
a second physical adapter formed on the second protective cover that causes the first protective cover to physically retract in response to the pressure applied by the insertion of the battery cartridge.

15. The electricity consuming system of claim 11 further comprising:
a battery cartridge insertion sensor included in the electric consuming device;
a first processor included in the electric consuming device;
a first memory included in the electric consuming device, wherein the first memory is accessible by the first processor; and
a first software routine stored in the first memory and executed by the first processor that performs steps comprising:
transmitting an expected cartridge configuration message in response to the insertion of the battery cartridge into the battery cartridge aperture;
a second processor included in the battery cartridge;
a second memory included in the battery cartridge, wherein the second memory is accessible by the second processor; and
a second software routine stored in the second memory and executed by the second processor that performs steps comprising:
receiving the expected cartridge configuration message in the second memory;
retrieving a power configuration from the second memory; and
comparing the expected cartridge configuration message with the retrieved power configuration, wherein the inserted battery cartridge supplies power to the device in response to the comparison revealing that the expected cartridge configuration message matches the power configuration.

16. The electricity consuming system of claim 11 wherein the electricity consuming device is a recharging board and wherein the electricity consuming device further comprises:
a power supply that receives alternating current when plugged into an electrical outlet;
a first processor included in the electric consuming device, wherein the first processor receives power from the power supply;
a first memory included in the electric consuming device, wherein the first memory is accessible by the first processor; and
a first software routine stored in the first memory and executed by the first processor that performs steps comprising:
receiving a cartridge configuration message from the battery cartridge in response to the insertion of the battery cartridge into the battery cartridge aperture;
retrieving a power configuration from the first memory; and
comparing the cartridge configuration message with the retrieved power configuration, wherein the recharging board supplies power to the inserted battery cartridge in response to the comparison revealing that the cartridge configuration message matches the retrieved power configuration.

17. The electricity consuming system of claim 16, wherein the recharging board includes a plurality of battery cartridge apertures with each of the apertures having a different external shape to accommodate a different type of battery cartridge, wherein each of the apertures forms a cavity with each cavity having a set of contacts, and wherein a different electrical supply is provided by the device to each of the sets of contacts.

* * * * *